United States Patent
Toyoda et al.

(10) Patent No.: US 9,272,584 B2
(45) Date of Patent: Mar. 1, 2016

(54) PNEUMATIC TIRE

(75) Inventors: Kenji Toyoda, Tokorozawa (JP); Sayaka Mishima, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 190 days.

(21) Appl. No.: 13/824,326

(22) PCT Filed: Sep. 16, 2011

(86) PCT No.: PCT/JP2011/071284
§ 371 (c)(1),
(2), (4) Date: Mar. 15, 2013

(87) PCT Pub. No.: WO2012/036292
PCT Pub. Date: Mar. 22, 2012

(65) Prior Publication Data
US 2013/0174956 A1    Jul. 11, 2013

(30) Foreign Application Priority Data

Sep. 16, 2010   (JP) .................................. 2010-207946

(51) Int. Cl.
*B60C 15/00* (2006.01)
*B60C 15/06* (2006.01)

(52) U.S. Cl.
CPC ......... *B60C 15/0607* (2013.04); *B60C 15/0036* (2013.04); *B60C 15/0054* (2013.04); *B60C 15/06* (2013.01); *B60C 2009/0276* (2013.04); *B60C 2015/009* (2013.04); *B60C 2015/061* (2013.04)

(58) Field of Classification Search
CPC .... B60C 15/00; B60C 15/0009; B60C 15/06; B60C 15/0603; B60C 15/0607
See application file for complete search history.

(56) References Cited

U.S. PATENT DOCUMENTS

| | | | | |
|---|---|---|---|---|
| 3,709,277 | A * | 1/1973 | Montagne | 152/558 |
| 4,086,948 | A * | 5/1978 | Suzuki et al. | 152/541 |
| 5,236,031 | A * | 8/1993 | Honbo | B60C 15/0027 152/541 |
| 6,273,162 | B1 * | 8/2001 | Ohara et al. | B60C 1/0008 152/539 |
| 6,427,743 | B1 | 8/2002 | Ueyoko et al. | |
| 6,752,186 | B1 * | 6/2004 | Ueyoko | B60C 13/00 152/454 |

(Continued)

FOREIGN PATENT DOCUMENTS

| | | | |
|---|---|---|---|
| EP | 1759892 | * | 3/2007 |
| JP | 61-275010 | A | 12/1986 |
| JP | 05124408 | * | 5/1993 |

(Continued)

OTHER PUBLICATIONS

Machine translation of EP 1759892, 2007.*

(Continued)

*Primary Examiner* — Justin Fischer
(74) *Attorney, Agent, or Firm* — Sughrue Mion, PLLC

(57) ABSTRACT

The disclosed pneumatic tire (1) comprises a stiffener (31) and a rubber pad (32) which, disposed between a toroidal carcass body (21) and a folded-back carcass portion (22) folded back at a bead core (11), are arranged so as to be oriented radially outwards of the tire from the bead core (11). Further, from the rim baseline (BL), the height KSH to the end (31A) of the stiffener (31), the height OWH to the maximum carcass width (20W), and the height FH to the end (101A) of the rim flange (101) fulfill 0.2≤[(KSH−FH)/(OWH−FH)]≤0.28.

7 Claims, 12 Drawing Sheets

(56) References Cited

U.S. PATENT DOCUMENTS

| | | | |
|---|---|---|---|
| 8,235,082 B2 * | 8/2012 | Kuniyasu | B60C 15/0018 |
| | | | 152/539 |
| 2011/0198011 A1 * | 8/2011 | Matsuda | B60C 5/14 |
| | | | 152/543 |

FOREIGN PATENT DOCUMENTS

| | | | |
|---|---|---|---|
| JP | 05139125 | * | 6/1993 |
| JP | 9-272313 A | | 10/1997 |
| JP | 11-20424 A | | 1/1999 |
| JP | 2886566 | * | 4/1999 |
| JP | 11-301218 A | | 11/1999 |
| JP | 2000-198326 A | | 7/2000 |
| JP | 2001-150910 A | | 6/2001 |
| JP | 2002-160510 A | | 6/2002 |
| JP | 2003-11622 A | | 1/2003 |
| JP | 2004-306742 A | | 11/2004 |
| JP | 2007-223516 | * | 9/2007 |
| JP | 2010-006322 A | | 1/2010 |
| WO | WO 01/60643 | * | 8/2001 |

OTHER PUBLICATIONS

International Search Report of PCT/JP2011/071284, dated Dec. 20, 2011.

Japanese Literature Submission, dated Sep. 24, 2014, issued in counterpart Japanese Patent Application No. 2012-534075.

* cited by examiner

FIG. 12

| | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 |
|---|---|---|---|---|---|---|---|
| CE/SH | 0.48 | 0.48 | 0.48 | 0.48 | 0.48 | 0.48 | 0.48 |
| G/BW AT POINT A | 0.37 | 0.37 | 0.37 | 0.37 | 0.37 | 0.37 | 0.37 |
| 100% ELONGATION MODULUS — STIFFENER/RUBBER MATERIAL | 2 | 2 | 2 | 2 | 2 | 2 | 2 |
| 100% ELONGATION MODULUS — RUBBER MATERIAL/PAD RUBBER | 1.55 | 1.55 | 1.55 | 1.55 | 1.55 | 1.55 | 1.55 |
| 100% ELONGATION MODULUS — BUFFER RUBBER/PAD RUBBER | - | - | - | 0.85 | - | - | - |
| (KSH-FH)/(OWH-FH) | 0.21 | 0.27 | 0.27 | 0.27 | - | 0.34 | 0.34 |
| Gmax/Gmin | - | - | 1.2 | - | - | 1.2 | 1.2 |
| DA/G | - | - | 0.3 | 0.78 | - | - | 0.1 |
| DISTORTION INDEX OF THE COATING RUBBER LAYER BONDED TO THE STIFFENER OF THE CARCASS BODY | 84 | 82 | 80 | 75 | 100 | 98 | 80 |
| CRACK IN THE COATING RUBBER LAYER BONDED TO THE STIFFENER OF THE CARCASS BODY | NO | NO | NO | NO | CRACKED | CRACKED | CRACKED IN THE PAD RUBBER |
| PRESENCE OR ABSENCE OF CORD BREAKAGE IN THE CARCASS FOLDED-BACK PORTION | NO | NO | NO | NO | NO | NO | NO |

PNEUMATIC TIRE

CROSS REFERENCE TO RELATED APPLICATIONS

This is a National Stage of International Application No. PCT/JP2011/071284 filed Sep. 16, 2011, claiming priority based on Japanese Patent Application No. 2010-207946 filed Sep. 16, 2010, the contents of all of which are incorporated herein by reference in their entirety.

TECHNICAL FIELD

The present invention relates to a pneumatic tire comprising a carcass having a carcass body composed of a ply formed of a plurality of carcass cords, covered with a rubber material, toroidally extending between a pair of bead cores, and a carcass folded-back portion that the carcass body wound around the bead core from inside toward outside of the tire and extended outside in the tire radial direction.

BACKGROUND ART

Stability in vehicle rolling and pitch depends on the strength of a part ranging from a bead portion to a sidewall portion of a pneumatic tire. Particularly, in a tire for a large-size vehicle compared with a vehicle for a passenger car, a sidewall portion located between a bead portion to a tread portion grounding a road surface is long, and is subjected to a heavy load. Thus, bending deformation is likely to occur in a sidewall portion falling outside in the width direction of a tire at a base point where a bead portion contacts a rim flange, thereby deteriorating the stability in rolling and pitch compared with a tire for a passenger car.

To solve the above problem, the applicants have proposed measures to prevent a bending deformation (see Patent Literature 1). The patent document 1 has disclosed a pneumatic tire comprising a carcass having a carcass body composed of a ply formed of a plurality of carcass cords, covered with a rubber material, toroidally extending between a pair of bead cores, and the carcass folded-back portion that the carcass body wound around the bead core from inside toward outside of the tire and extended outside in the tire radial direction, wherein the rigidity of a bead portion is enhanced by providing a filling material called a stiffener with a 100% elongation modulus greater than that of a rubber material and a rubber with JIS A hardness of 50 degrees to 85 degrees between the carcass body and the carcass folded-back portion (see Patent Literature 1).

CITATION LIST

Patent Literature

Patent Literature 1: Japanese Published Unexamined Application No. 2001-150910

SUMMARY OF INVENTION

When a heavy load is applied in a conventional pneumatic tire, bending deformation occurs in a sidewall portion at a base point where a bead portion contacts a rim flange. When the sidewall portion falls outside in the tire width direction, in the sidewall portion, a rubber material located between a stiffener and a carcass cord and coating a carcass body is subjected to a tensile strain of pulling outside in the tire radial direction along a carcass body.

Further, when a sidewall portion falls outside in the tire width direction, a stiffener located between a carcass body and a carcass folded-back portion is held and compressed between the carcass body and the carcass folded-back portion. A stiffener expands outside in the tire radial direction along the carcass body, and a rubber material is pulled outside in the tire radial direction along the carcass body, thereby promoting distortion.

When a rubber material between a stiffener and a carcass cord is repeatedly subjected to distortion, a stiffener and a rubber material become easy to peel off, or a rubber material becomes easy to peel off from a carcass cord, causing deterioration in the durability of a part ranging from a bead portion to a sidewall portion. In other words, further improvements have been required to ensure the rigidity and durability of a part ranging from a bead portion to a sidewall portion, in a pneumatic tire.

Accordingly, it is an object of the present invention to provide a pneumatic tire, which simultaneously ensures the rigidity and enhances the durability of a part ranging from a bead portion to a sidewall portion at a high level.

The applicants of the present invention have found that in a region of a pneumatic tire subjected to a stress from a rim flange, an excessive distortion is applied to a rubber material coating a carcass cord by providing a first filling material in order to prevent falling of a sidewall portion, and have concluded that it is important not to provide a first filling material in a region of the tire subject to a stress from a rim flange. The applicants have minutely studied the relationship between the carcass body and first filling material, which can prevent shear distortion occurred in the rubber material contacting the first filling material of the carcass body without losing the essential function of the first filling material to prevent falling of the sidewall portion.

As a result of the study, it has been proved that when a relation of $0.2 \leq [(KSH-FH)/(OWH-FH)] \leq 0.28$ is satisfied, an index of distortion applied to the rubber material caused by deformation of a sidewall portion can be minimized.

The present invention has following features. It is summarized as a pneumatic tire comprising a carcass having a carcass body composed of a ply formed of a plurality of carcass cords, covered with rubber material, toroidally extending between a pair of bead cores, and a carcass folded-back portion where the carcass body wound around the bead core from inside toward outside of the tire and extended outside in a tire radial direction, wherein a gradual decrease region is provided, in which a distance between the carcass body and the carcass folded-back portion along a line normal to the carcass body gradually decreases toward outside in the tire radial direction, a first filling material and a second filling material sequentially arranged from the bead core toward outside in the tire radial direction, are provided between the carcass body and the carcass folded-back portion located outside in a tire width direction than the carcass body, an end of the first filling material outside in the tire radial direction is located in the gradual decrease region, a part of the first filling material and the second filling material contacts with the rubber material forming the carcass body, the end of the first filling material outside in the tire radial direction and an end of the second filling material inside in the tire radial direction are overlapped in the tire width direction, a thickness in the tire width direction of the first filling material at the end outside in the tire radial direction decreases toward outside in the tire radial direction, an end of the second filling material inside in the tire radial direction is located more inside in the tire radial direction than a contact position in contact with a rim flange of a rim defined by standards for mounting the pneumatic tire in the bead portion of the pneumatic tire, a height CE from a rim base line, which is an axis line of the tire passing through a position in the rim defining a rim diameter, to an end of the carcass folded-back portion, and a height OWH from the rim base line to a carcass maximum width portion of the carcass body having a maximum width in the tire width direction, satisfy a relation of $0.85\text{OWH} \le \text{CE} \le 1.2\text{OWH}$, and a height KSH from the rim base line to the end of the first filling material outside in the tire radial direction, the height OWH, and a height FH from the rim base line to the end of the rim flange outside in the tire radial direction, satisfy a relation of $0.2 \le [(\text{KSH}-\text{FH})/(\text{OWH}-\text{FH})] \le 0.28$.

As described above, it is possible to prevent peel-off of the rubber material from the first filling material and from the carcass cord caused by deformation of a sidewall portion, and to prevent deterioration of the durability of a part ranging from a bead portion to a sidewall portion, without loosing the essential function of the first filling material to prevent falling of a sidewall portion.

Therefore, according to the pneumatic tire of the present invention, it is possible to simultaneously ensure the rigidity and enhance the durability of a part ranging from a bead portion to a sidewall portion at a high level.

BRIEF DESCRIPTION OF DRAWINGS

FIG. 12 is a table showing the results of a durability test of a pneumatic tire.

DESCRIPTION OF EMBODIMENTS

Figure 1:
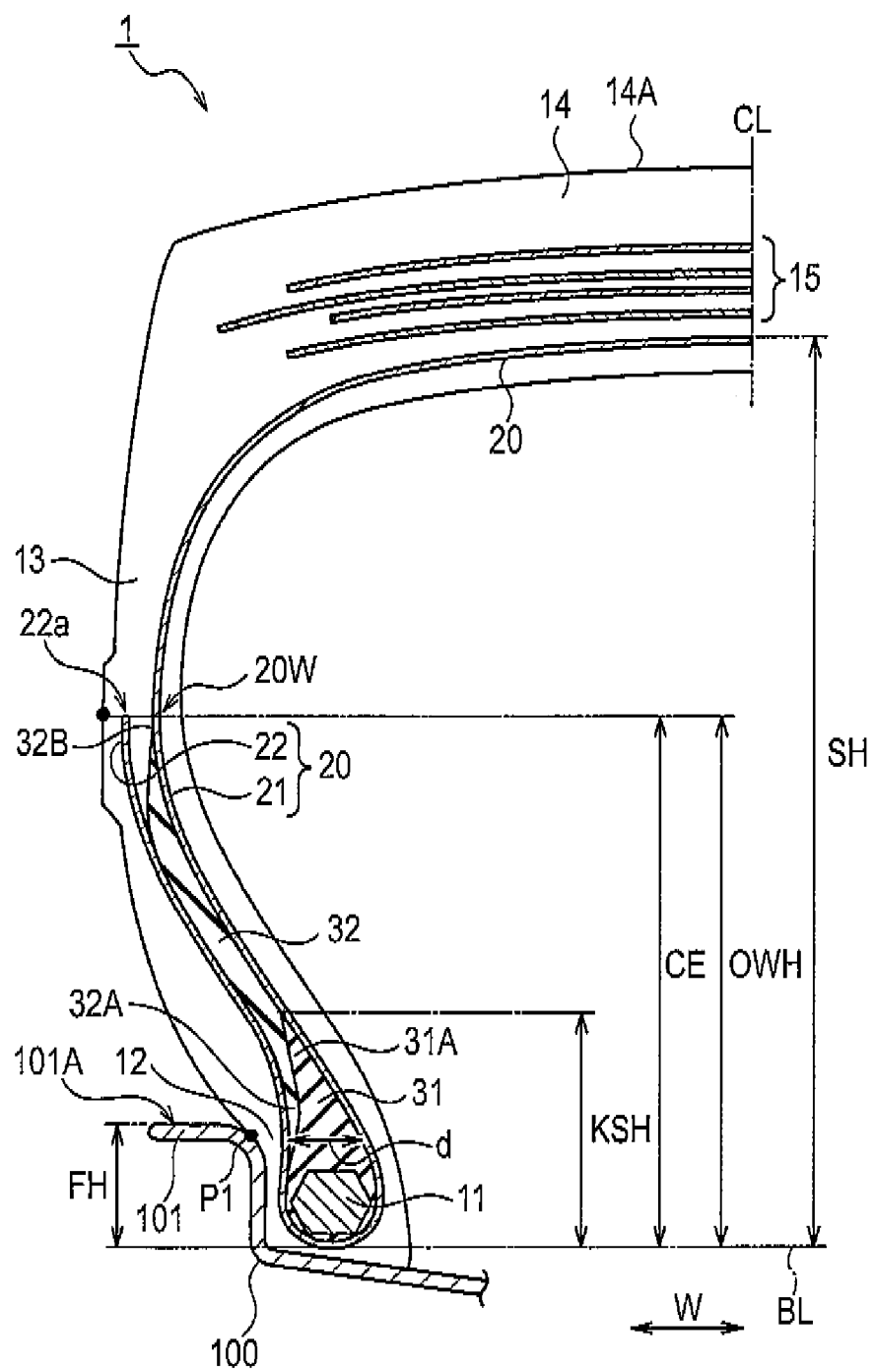
FIG. 1 shows sectional view in tire radial direction and tire width direction of a pneumatic tire according to a first embodiment.

Embodiments of a pneumatic tire according to the present invention will be described with reference to the accompanying drawings. In particular, (1) first embodiment, (2) second embodiment, (3) third embodiment, (4) fourth embodiment and (5) other embodiment will be explained. In the drawings, the same or like reference signs are given to the same or like parts. It is to be noted that the drawings are schematic and the dimensions or ratios are different from real values. Therefore, actual dimensions should be determined according to the following explanations. The drawings include parts of different dimensions or ratios.

First Embodiment

A first embodiment will be explained according to the following sections, particularly, (1-1) General configuration of a pneumatic tire, (1-2) Configuration of a part ranging from a bead portion to a sidewall portion, and (1-3) Functions and effects.

(1-1) General Configuration of a Pneumatic Tire

Hereinafter, a general configuration of a pneumatic tire will be explained with reference to the drawings. FIG. 1 is an illustration a configuration of a pneumatic tire 1. The pneumatic tire 1 comprises a pair of bead portions 12 having a bead core 11, a pair of sidewall portions 13, and a tread portion 14 continuous to the sidewall portion. FIG. 1 shows a bead core 11, a bead portion 12, and a sidewall portion 13 of only one side with respect to an equator line CL in the pneumatic tire 1. The pneumatic tire 1 is provided with a carcass 20 toroidally extending between a pair of bead cores 11. A plurality of belt layers 15 is provided between a carcass 20 and a grounding surface 14A of a tread portion 14 contacting a road surface.

The carcass 20 has a carcass body 21 and a carcass folded-back portion 22. The carcass folded-back portion 22 is rewound around the bead core 11 from inside toward outside of the tire, and is extended outside in the tire radial direction. In the embodiment, an end 22a of the carcass folded-back portion 22 extends up to a carcass maximum width portion 20W in the width direction W of the tire.

Between the toroidally carcass body 21 and the carcass folded-back portion 22 folded back from the bead core 11, there are provided a stiffener 31 and a pad rubber 32 arranged sequentially from the bead core 11 outside in the tire radial direction. In the embodiment, the stiffener 31 is configured to a first filling material, and the pad rubber 32 is configured to a second filling material.

An end 31A of the stiffener 31 outside in the tire radial direction and an end 32A of the pad rubber 32 inside in the tire radial direction are overlapped in the width direction W of the tire. The stiffener 31 decreases the thickness d in the width direction W of the tire as it moves outside in the tire radial direction. The end 32A of the pad rubber 32 inside in the tire radial direction is located more inside in the tire radial direction in the bead portion 12 of the pneumatic tire 1 than a point P1 where a rim flange 101 of a standard rim 100 defined by standards for mounting the pneumatic tire 1 contacts with the bead potion 12 of the pneumatic tire 1.

A 100% elongation modulus of the stiffener 31 is greater than a 100% elongation modulus of a rubber material 24, and a 100% elongation modulus of the rubber material 24 is greater a 100% elongation modulus of the pad rubber 32. In other words, the 100% elongation modulus Mn1 of the stiffener 31, the 100% elongation modulus Mn2 of the pad rubber 32 and the 100% elongation modulus Mn3 of the rubber material 24, respectively, satisfy the relation of $Mn1 > Mn3 > Mn2$ The height KSH from the rim base line BL, which is an axis line direction of the tire passing through a position to define a rim diameter in the standard rim 100, to the end 31A of the stiffener 31 outside in the tire radial direction, the height OWH from the rim base line BL to the carcass maximum width portion 20W, and the height FH from the rim base line BL to the end 101A of the rim flange 101 outside in the tire radial direction satisfy the relation of $0.2 \leq [(KSH-FH)/(OWH-FH)] \leq 0.28$ The height CE from the rim base line BL, which is an axis line direction of a tire passing through a position to define a rim diameter in the standard rim 100, to the end 22a of the carcass folded-back portion 22, and the height OWH from the rim base line BL to the carcass maximum width portion 20W satisfy the relation of $0.85 OWH \leq CE \leq 1.2 OWH$ Therefore, the end 22a of the carcass folded-back portion 22 extends to the vicinity of the carcass maximum width portion 20W in the width direction W of the tire. In the embodiment, the height CE from the rim base line BL to the end 22a of the carcass folded-back portion 22 is substantially equal to the height OWH from the rim base line BL to the carcass maximum width portion 20W. The fact that the height CE is substantially equal to the height OWH means at least that the relation of $|CE-OWH| \times 100/OWH$ 15% is satisfied.

The height CE from the rim base line BL to the end 22a of the carcass folded-back portion 22 and the height SH from the rim base line BL to the carcass 20 on the equator line CL of the pneumatic tire 1 satisfy the relation of $0.4 SH \leq CE \leq 0.6 SH$.

In the embodiment, an end 32B of the pad rubber 32 outside in the tire radial direction is located in the vicinity of the carcass maximum width portion 20W. In other words, the height PSH from the rim base line BL to the end 32B of the pad rubber 32 outside in the tire radial direction is substantially equal to the height OWH from the rim base line BL to the carcass maximum width portion 20W. The fact that the height PSH is substantially equal to the height OWH means at least that the relation of $|PSH-OWH| \times 100/OWH \leq 15\%$ is satisfied.

The height KSH, the height OWH, the height FH, the height CE, and the height SH are measured along the tire radial direction.

The standard rim 100 means a rim defined by standards. The standards are determined by industrial standards valid in districts where a tire is manufactured or used. For example, "YEAR BOOK OF THE TIRE AND RIM ASSOCIATION INC" in U.S.A, "STANDARDS MANUAL OF THE EUROPEAN TIRE AND RIM TECHNICAL ORGANIZATION" in Europe, and "JATMA YEAR BOOK OF JAPAN AUTOMOBILE AND TIRE ASSOCIATION" in Japan.

(1-2) Configuration of Part Ranging from a Bead Portion to a Sidewall Portion

Figure 2:
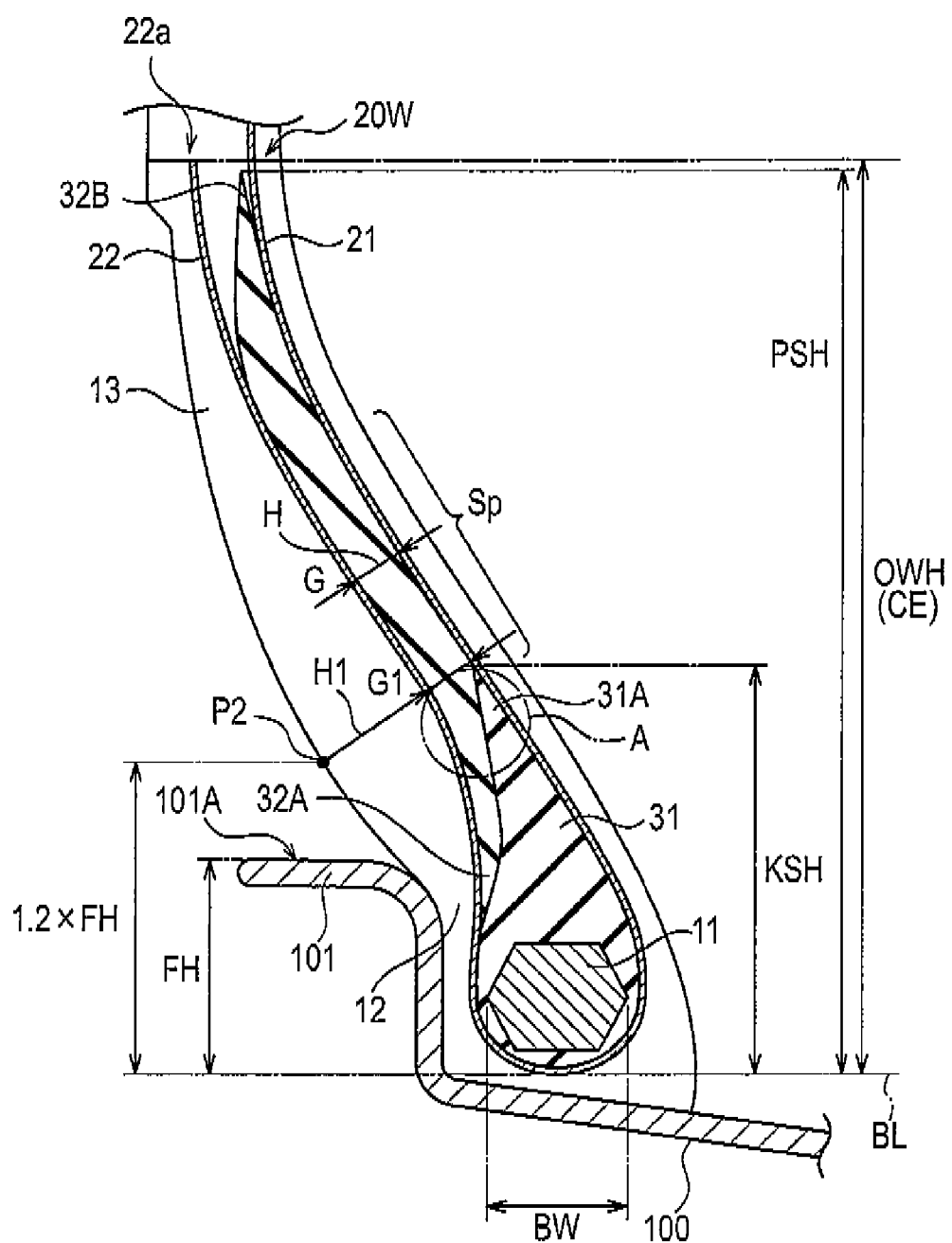
FIG. 2 is a schematic diagram illustrating a part ranging from a bead portion to a sidewall portion of the pneumatic tire according to the first embodiment.
Figure 3:
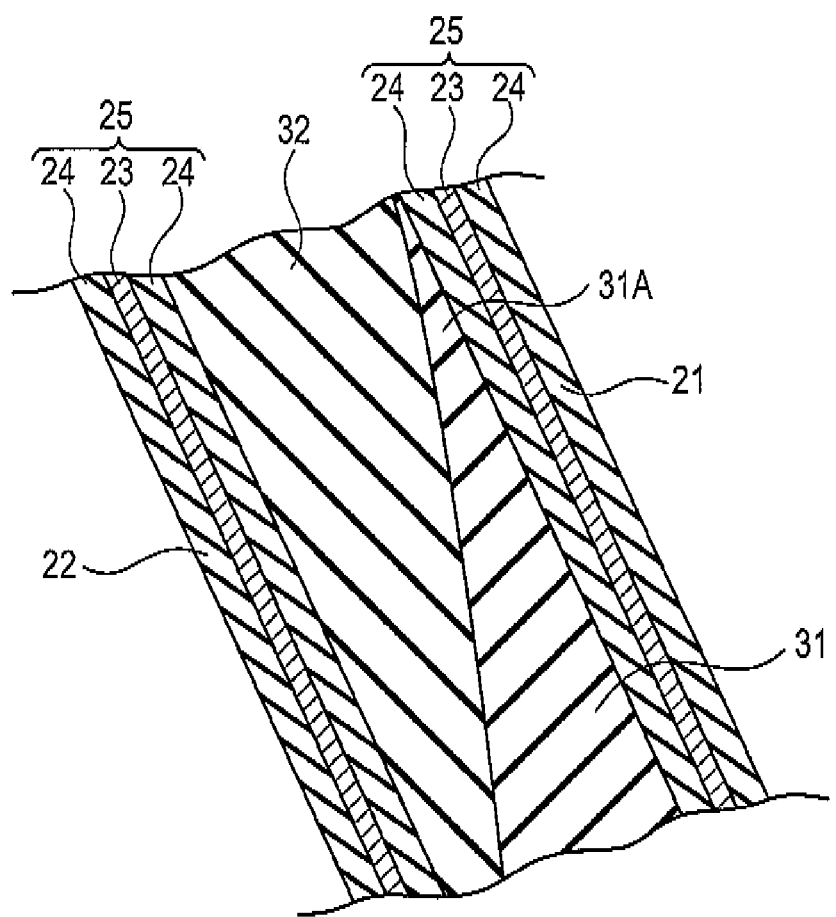
FIG. 3 is a magnified view of the region A in FIG. 2.

FIG. 2 is a schematic diagram illustrating the bead portion 12 to a sidewall portion 13 of the pneumatic tire 1. FIG. 3 is a magnified view of the region A in FIG. 2, that is, a magnified sectional view of a stiffener and a carcass in the radial direction and the tread width direction of the pneumatic tire of the first embodiment.

A carcass 20 comprises a ply 25 composed of a plurality of carcass cords 23 coated with a rubber material 24 toroidally extending between a pair of bead cores 11. A part of the stiffener 31 and the pad rubber 32 contacts at least the rubber material 24 that constitute the carcass body 21. The carcass 20 has a parallel region Sp, where the distance G between the centers of the cords of the carcass body 21 and the carcass folded-back portion 22 on a line H normal to the carcass body 21 becomes substantially constant. The substantially constant distance G means that when a minimum value of the distance G is assumed to be Gs, the following relation is at least satisfied: $Gs \leq G \leq 1.2 Gs$ The end 31A of the stiffener 31 outside in the tire radial direction is located in the parallel region Sp.

In the embodiment, when defining a line H1 normal to the carcass body 21 passing through a point P2 equivalent to 1.2FH in the bead portion 12 from a rim base line toward outside in the tire radial direction, the distance G1 between the carcass body 21 and the carcass folded-back portion 22 on the normal line H1 and the length BW of the bead core 11 in the tire width direction satisfy the relation of $0.3 BW \leq G1 \leq 0.4 BW$ Further, in the embodiment, the distances G and G1 between the carcass body 21 and the carcass folded-back portion 22 are the distances between the centers of the carcass cords 23 that constitute the carcass body 21 and the carcass folded-back portion 22.

(1-3) Functions and Effects

Figure 4:
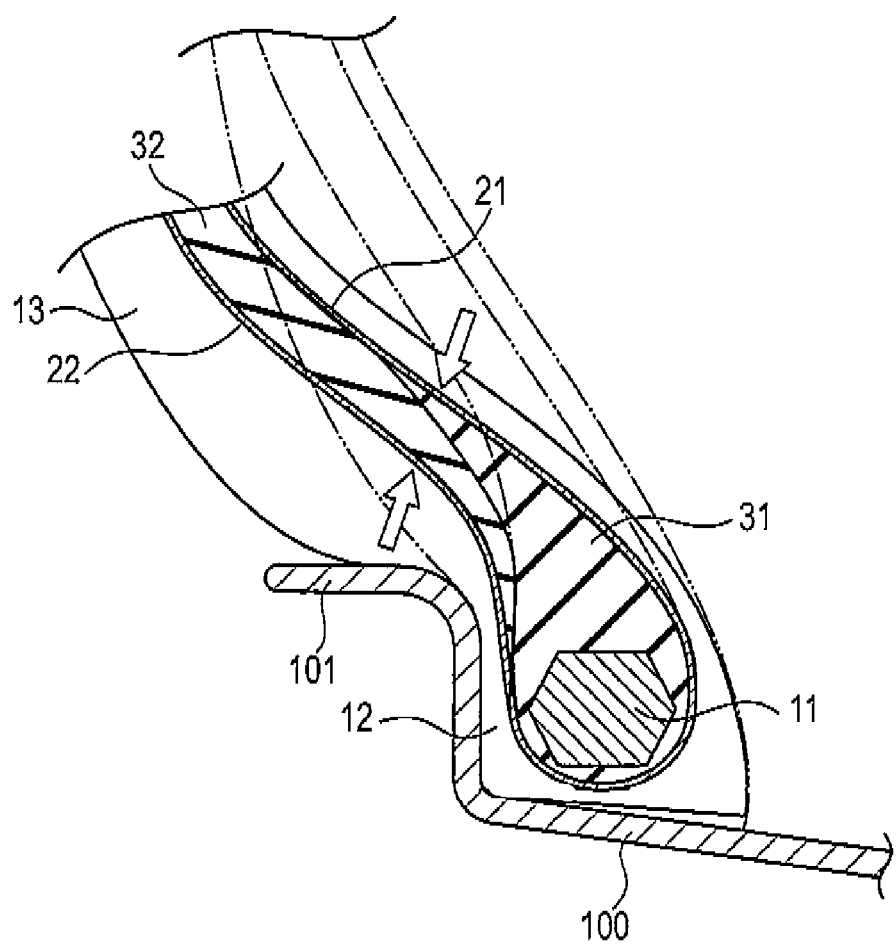
FIG. 4 is a schematic diagram explaining aspects of a bead portion of a pneumatic tire being deformed.

FIG. 4 is a schematic diagram explaining aspects of the sidewall portion 13 of the pneumatic tire 1 being deformed. When simulating aspects of the sidewall portion 13 of the pneumatic tire 1 being deformed by using a finite element analysis method, the following deformation can be simulated. When a heavy load is applied to the pneumatic tire 1, bending deformation occurs in the sidewall portion 13 at a base point of a part where the bead portion 12 contacts the rim flange 101. In FIG. 4, a chain line indicates the sidewall portion 13 before being deformed, and a solid line indicates the wall portion 13 after being deformed. When the sidewall portion 13 falls outside in the tire width direction, a force indicated by the arrow direction is applied to the part where the bead portion 12 continues to the sidewall portion 13.

At this time, the carcass body 21 becomes a neutral axis and deforms a little, and the stiffener 31 and pad rubber 32 arranged between the carcass body 21 and carcass folded-back portion 22 are pressed and deformed as being compressed between the carcass body 21 and the carcass folded-back portion 22.

Figure 5:
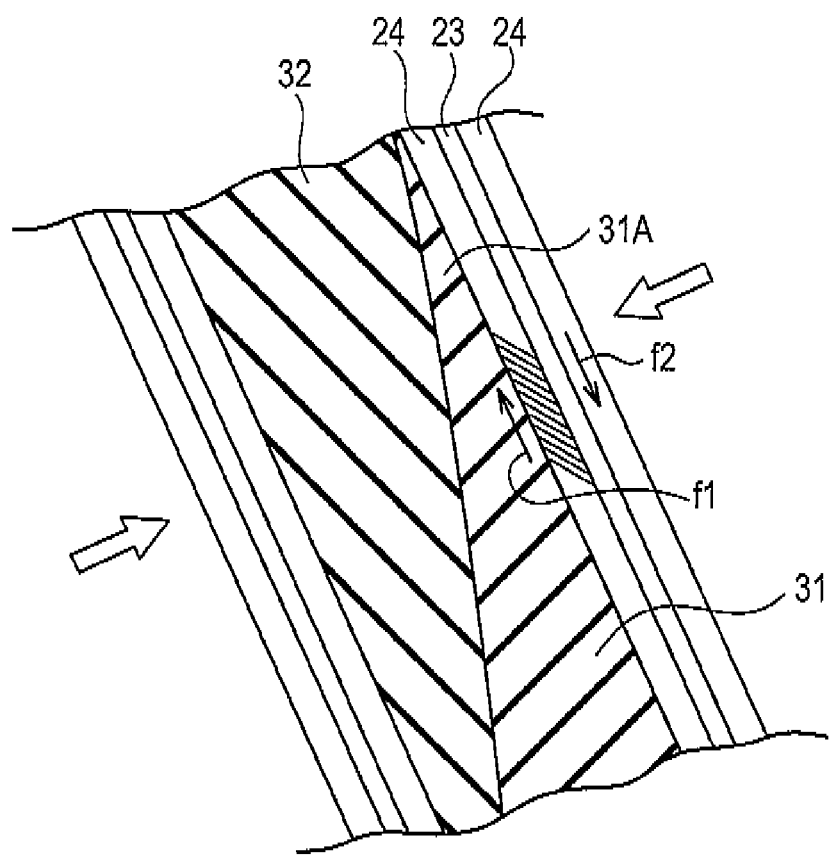
FIG. 5 is a magnified view of a deformed bead portion.

FIG. 5 is a magnified view showing the states of the carcass 20 and stiffener 31 in the deformed sidewall portion 13. When the sidewall portion 13 falls outside in the tire width direction at a base point (a neutral axis) of the part where the bead portion 12 contacts the rim flange 101, inside the sidewall portion 13, the rubber material 24 located between the stiffener 31 and carcass cord 23 suffers distortion of pulling toward in the outside in tire radial direction along the carcass body 21 (indicated by the black arrow f1 in FIG. 5). The rubber material 24 located more inside in the tire width direction than the carcass cord 23 suffers distortion of pulling inside in the tire radial direction along the carcass body 21 (indicated by the black arrow f2 in FIG. 5).

The stiffener 31 is pressed and compressed between the carcass body 21 and the carcass folded-back portion 22, and is expanded outside in the tire radial direction along the carcass body 21. As a result, the rubber material 24 is pulled outside in the tire radial direction along the carcass body, and the distortion indicated by the black arrow f1 direction is increased.

According to the analysis of deformation by a finite element method, the applicants minutely studied the relationship between the stiffener 31 and carcass 20, which can prevent shear distortion in the rubber material 24 close to the stiffener 31 of the carcass body 21 without loosing the essential function of the stiffener 31 to prevent falling of the sidewall portion 13.

Figure 6:
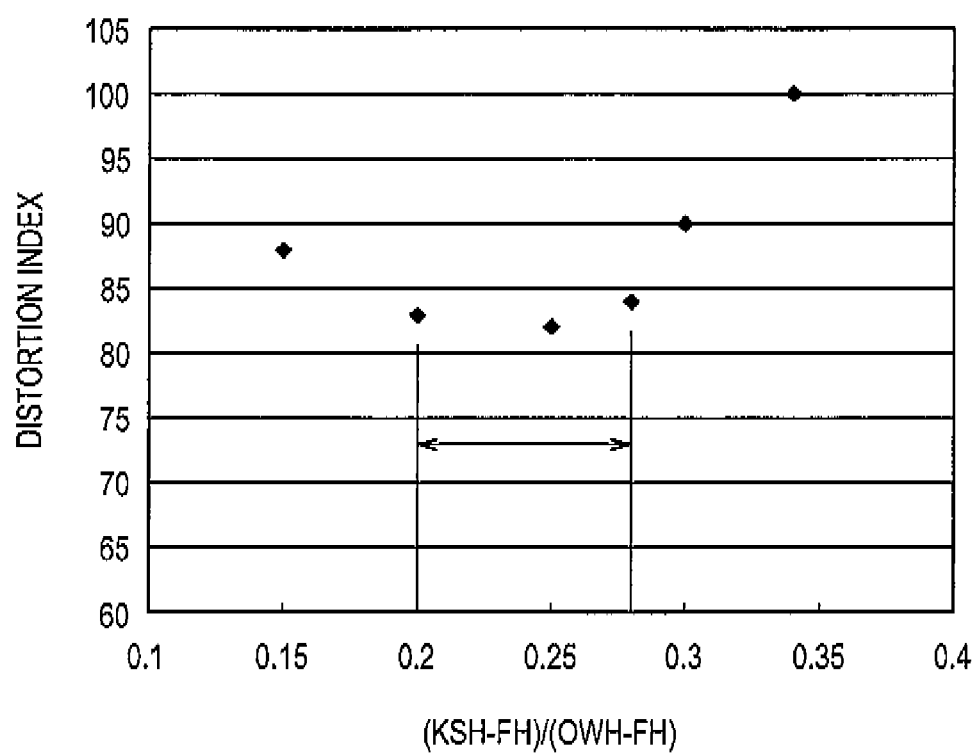
FIG. 6 is a graph showing the results of calculation of an index of distortion with respect to the value of (KSH−FH)/(OWH−FH) based on a finite element method.

FIG. 6 is a graph showing the results of analysis of deformation based on a finite element method. An index that represents the distortion is calculated by changing the value of (KSH−FH)/(OWH−FH) to 0.15 to 0.35. As a result of the analysis, it is proved that an index of distortion applied to the rubber material 24 due to deformation of the sidewall portion 13 can be decreased when the height KSH from the rim base line BL to the end 31A outside in the tire radial direction of the stiffener 31, the height OWH from the rim base line BL to the carcass maximum width portion 20W, and the height FH from the rim base line BL to the end 101A of the rim flange 101 outside in the tire radial direction satisfy the relation of $0.2 \leq [(KSH-FH)/(OWH-FH)] \leq 0.28$.

As the distortion applied to the rubber material 24 due to deformation of the sidewall portion 13 can be decreased, it is possible to prevent peel-off of the rubber material 24 from the stiffener 31 due to deformation of the sidewall portion 13, peel-off of the rubber material 24 from the carcass cord 23, and to prevent deterioration in the durability of the part ranging from the bead portion 12 to the sidewall portion 13.

Further, in the embodiment, when the 100% elongation modulus Mn1 of the stiffener 31, the 100% elongation modulus Mn2 of the pad rubber 32, and the 100% elongation modulus Mn3 of the rubber material 24, respectively, satisfy the relation of Mn1>Mn3>Mn2.

Even if deformation occurs in the rubber material 24 contacting the stiffener 31 due to deformation of the sidewall portion 13, is easy to follow the deformation, and the rubber material 24 can be prevented from being damaged by a shear stress. It is thus possible to ensure the rigidity and to improve the durability of the part ranging from the bead portion 12 to the sidewall portion 13 at a high level in a pneumatic tire.

In the pneumatic tire 1, the end 22a of the carcass folded-back portion 22 is arranged at a position at the height CE from the rim base line BL, and the height CE and the height SH from the rim base line BL to the carcass on the equator line CL of the tire satisfy the relation of $0.4SH \leq CE \leq 0.6SH$. By arranging the end 22a of the carcass folded-back portion 22 to satisfy this relationship, it is possible to prevent cracks in a surrounding rubber due to the end 22a of the carcass folded-back portion 22.

Further, in the pneumatic tire 1, when defining a line H normal to the carcass body 21 passing through a point equivalent to 1.2FH in the bead portion 12 from the rim base line BL toward outside in the tire radial direction, the distance G between the carcass body 21 and the carcass folded-back portion 22 on the normal line H and the length BW of the bead core 11 in the tire width direction satisfy the relation of $0.3BW \leq G \leq 0.4BW$.

At the point P2 equivalent to 1.2FH from the rim base line BL to outside in the tire radial direction, bending deformations of the carcass body 21 and the carcass folded-back portion 22 become maximized. By setting the distance G between the carcass body 21 and the carcass folded-back portion 22 close to the above-mentioned range in this part, a compression strain produced in the carcass folded-back portion 22 can be decreased.

(2) Second Embodiment

Figure 7:
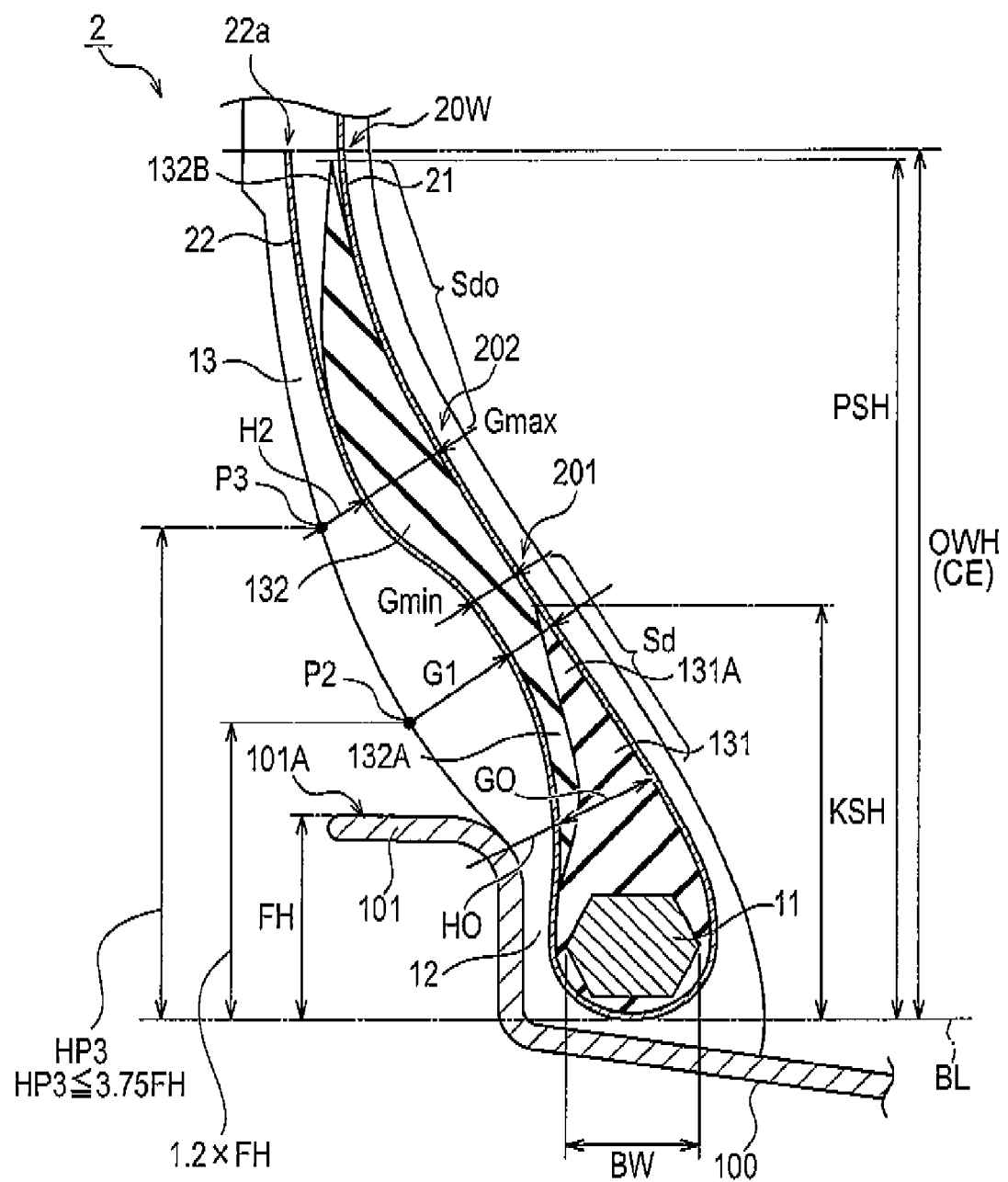
FIG. 7 shows a magnified sectional view in tire radial direction and tire width direction illustrating a part ranging from a bead portion to a sidewall portion of a pneumatic tire according to a second embodiment.

A second embodiment will be explained with reference to the drawings. Particularly, explanations will be given of (2-1) configuration of a part ranging from a bead portion to a sidewall portion, and (2-2) Functions and effects. FIG. 7 shows a magnified sectional view in tire radial direction and tire width direction illustrating a part ranging from a bead portion to a sidewall portion of a pneumatic tire according to a second embodiment. In the second embodiment, the same reference signs are given to the same parts as those in the first embodiment, and detailed description thereof is omitted.

(2-1) Configuration of a Part Ranging from a Bead Portion to a Sidewall Portion

In a pneumatic tire 2 shown as a second embodiment, the space between the carcass body 21 and the carcass folded-back portion 22 varies outside in the tire radial direction. In the pneumatic tire 2 of the second embodiment, a stiffener 131 and a pad rubber 132 are provided between a carcass body 21 and a carcass folded-back portion 22.

In the pneumatic tire 2 shown as a second embodiment, the height KSH from a rim base line BL to an end 131A of the stiffener 131 outside in the tire radial direction, the height OWH from the rim base line BL to the carcass maximum width portion 20W, and the height FH from the rim base line BL to an end 101A of a rim flange 101 outside in the tire radial direction satisfy the relation of $0.2 \leq [(KSH-FH)/(OWH-FH)] \leq 0.28$.

Further, the 100% elongation modulus Mn1 of the stiffener 131, the 100% elongation modulus Mn2 of the pad rubber 132, and the 100% elongation modulus Mn3 of the rubber material 24, respectively, satisfy the relation of Mn1>Mn3>Mn2.

Further, a carcass 20 has a gradual decrease region Sd, where the distance G0 between the carcass body 21 and the carcass folded-back portion 22 on the line OH normal to the carcass body 21 gradually decreases toward outside in the tire radial direction, and the end 131A of the stiffener 131 outside in the tire radial direction is located in the gradual decrease region Sd.

Further, in the second embodiment, the carcass 20 has a shortest part 201, where the distance G from the carcass body 21 to the carcass folded-back portion 22 becomes minimum in the gradual decrease region Sd, in a part outside the gradual decrease region Sd outside in the tire radial direction. The distance from the carcass body 21 to the carcass folded-back portion 22 in the shortest portion is expressed as Gmin.

In a part outside the shortest part 201 outside in the tire radial direction, there is provided a longest part 202 where the distance G from the carcass body 21 to the carcass folded-back portion 22 becomes maximum. The distance from the carcass body 21 to the carcass folded-back portion 22 in the longest part 202 is expressed as Gmax.

In the embodiment 2, there is an outer gradual decrease region Sdo where the distance from the carcass body 21 to the carcass folded-back portion 22 gradually decreases from the longest part 202 toward outside in the tire radial direction. When defining a line H2 normal to the carcass body 21 passing through the longest part 202 and a point P3 intersecting the surface of the sidewall portion 13, the height HP3 from the rim base line BL to the intersection point P3 satisfies the relation of $HP3 \leq 3.75FH$.

In the embodiment, the distances Gmin, Gmax, and G0 between the carcass body 21 and the carcass folded-back portion 22 are the distances between the centers of the carcass cords 23 that constitute the carcass body 21 and the carcass folded-back portion 22.

(2-2) Functions and Effects

In the pneumatic tire 2, a shortest part 201, where the distance G from the carcass body 21 to the carcass folded-back portion 22 becomes minimum in the gradual decrease region Sd, is provided in a part outside the gradual decrease region Sd outside in the tire radial direction. In the gradual decrease region Sd where the distances between the cords forming the carcass body 21 and carcass folded-back portion 22 gradually decreases, deformation due to compression occurred in the carcass folded-back portion 22 is decreased.

As the longest part 202 is provided by gradually increasing the distance between the carcass body 21 and the carcass folded-back portion 22 from the shortest part 201 outside in the tire radial direction, the carcass folded-back portion 22 separates from a position (a neutral axis) that is a base point of bending the carcass folded-back portion 22, the carcass folded-back portion 22 is pulled outside in the tire radial direction, and deformation due to compression occurred in the carcass folded-back portion 22 is decreased.

Therefore, it is possible to prevent peel-off of the rubber material 24 from the stiffener 131 due to deformation of the sidewall portion 13, peel-off of the rubber material 24 from the carcass cord 23, and deterioration in the durability of the part ranging from the bead portion 12 to the sidewall portion 13. It is thus possible to ensure at a high level, the rigidity and to improve the durability of the part ranging from the bead portion 12 to the sidewall portion 13 in the pneumatic tire. By setting the longest part 202 between to 3.75FH from the rim base line BL, it is possible to increase the ratio of the pad rubber and to prevent a large shear distortion in the rubber material 24.

(3) Third Embodiment

Figure 8:
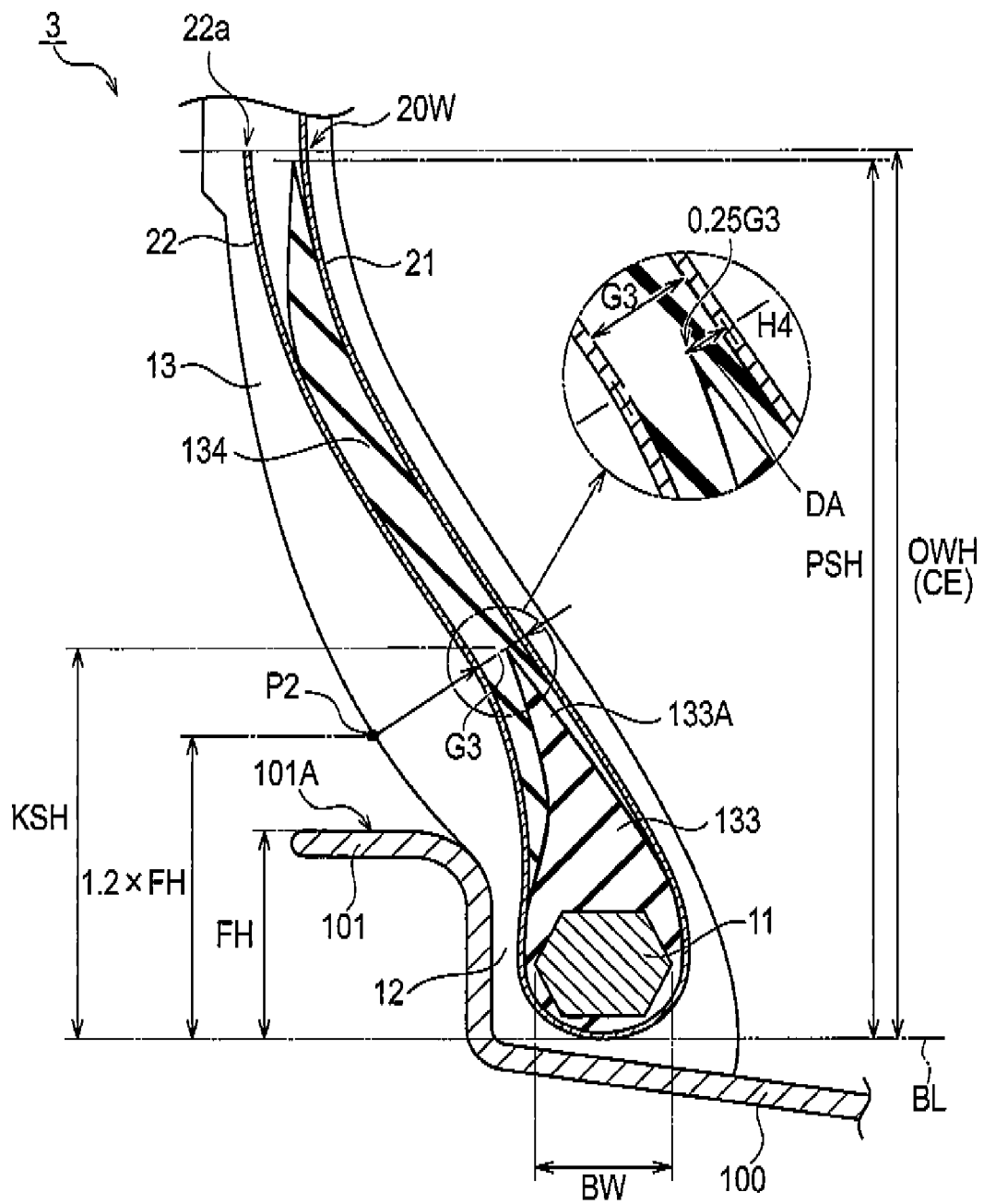
FIG. 8 shows a magnified sectional view in tire radial direction and tire width direction illustrating a part ranging from a bead portion to a sidewall portion of a pneumatic tire according to a third embodiment.

A third embodiment will be explained with reference to the drawings. Particularly, explanations will be given of (3-1) Configuration of a part ranging from a bead portion to a sidewall portion, and (3-2) Functions and effects. FIG. 8 shows a magnified sectional view in tire radial direction and tire width direction illustrating a part ranging from a bead portion to a sidewall portion of a pneumatic tire according to a third embodiment. In the third embodiment, the same reference signs are given to the same parts as those in the first and second embodiments, and detailed description thereof is omitted.

(3-1) Configuration of Part Ranging from a Bead Portion to a Sidewall Portion

In a pneumatic tire 3 shown as a third embodiment, a stiffener 133 and a pad rubber 134 are provided between a carcass body 21 and a carcass folded-back portion 22.

In the pneumatic tire 3 shown as a third embodiment, the height KSH from a rim base line BL to an end 133A of the stiffener 133 outside in the tire radial direction, the height OWH from the rim base line BL to the carcass maximum width portion 20W, and the height FH from the rim base line BL to an end 101A of a rim flange 101 outside in the tire radial direction satisfy the relation of $0.2 \leq [(KSH-FH)/(OWH-FH)] \leq 0.28$.

Further, the 100% elongation modulus Mn1 of the stiffener 133, the 100% elongation modulus Mn2 of the pad rubber 134, and the 100% elongation modulus Mn3 of the rubber material 24, respectively, satisfy the relation of $Mn1>Mn3>Mn2$.

On a line H4 normal to the carcass body 21 passing through the end 133A of the stiffener 133 outside in the tire radial direction, when the distance between the centers of the cords of the carcass body 21 and the end 133A of the stiffener 133 is defined as DA, and the distance between the carcass body 21 and the carcass folded-back portion 22 on the normal line H4 as G3, DA is within a range of 0.25G3 to 0.75G3.

(3-2) Functions and Effects

In the pneumatic tire 3, the carcass body 21 does not directly contact the end 133A of the stiffener 133, and it is possible to decrease distortion of the rubber material 24 of the carcass body 21 due to the end 133A of the stiffener 133. Therefore, it is possible to prevent peel-off of the rubber material 24 from the stiffener 133 due to deformation of the sidewall portion 13, peel-off of the rubber material 24 from the carcass cord 23, and reduction in the durability of the part from the bead portion 12 to the sidewall portion 13. When the distance G3 between the carcass body 21 and the carcass folded-back portion 22 on the normal line H4 of the carcass body 21 does not satisfy the relation of $0.25G3 \leq DA \leq 0.75G3$, the thickness of the pad rubber 134 decreases, distortion concentrates on the pad rubber 134, and the rubber material becomes easy to peel off from the pad rubber 134. This is unsuitable.

(4) Fourth Embodiment

Figure 9:
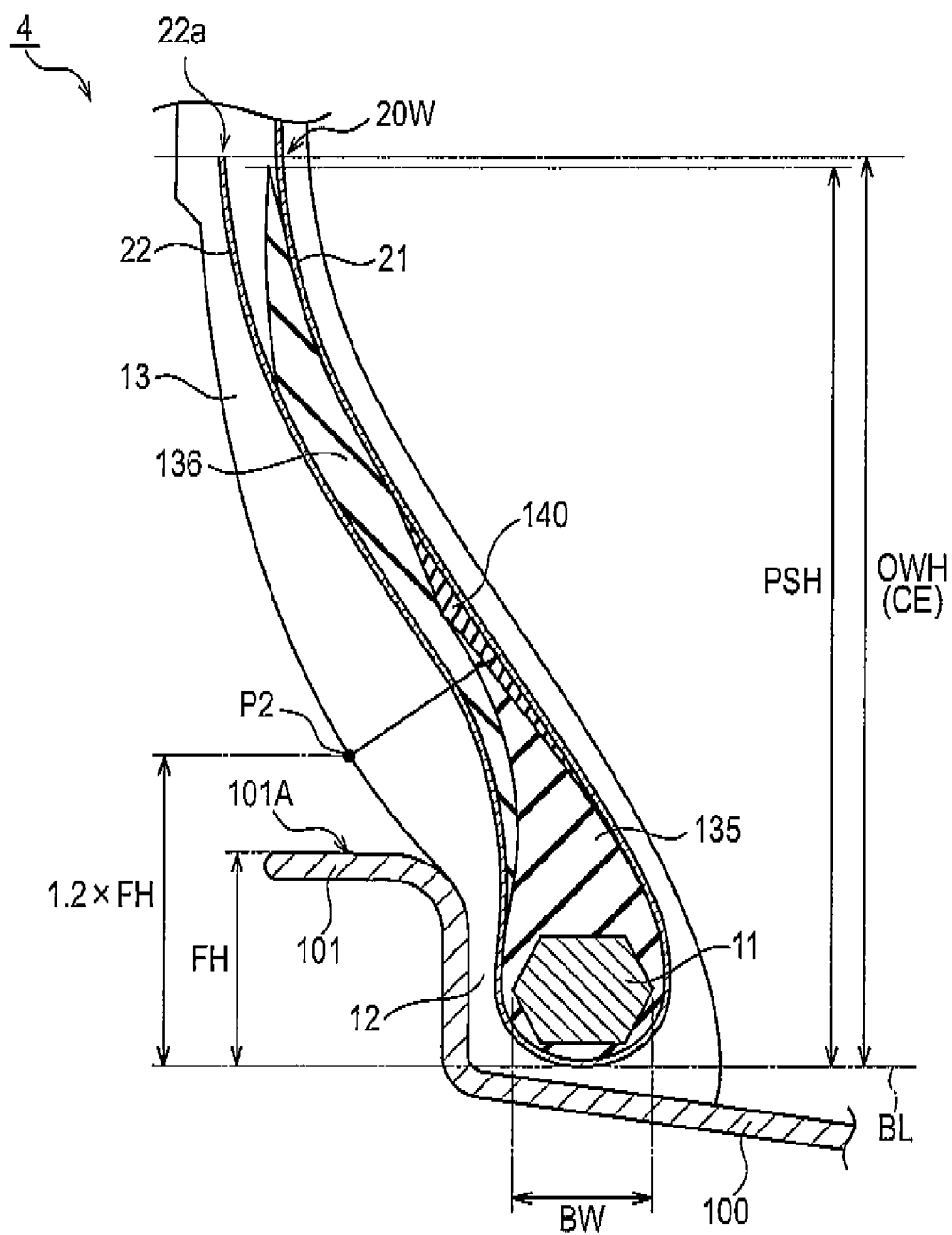
FIG. 9 shows a magnified sectional view in tire radial direction and tire width direction illustrating a part ranging from a bead portion to a sidewall portion of a pneumatic tire according to a fourth embodiment.

A fourth embodiment will be explained with reference to the drawings. Particularly, explanations will be given of (4-1) configuration of a part ranging from a bead portion to a sidewall portion, and (4-2) Functions and effects. FIG. 9 shows a magnified sectional view in direction of the tire and width directions of the tire illustrating a part ranging from a bead portion to a sidewall portion of a pneumatic tire according to the fourth embodiment. In the fourth embodiment, the same reference signs are given to the same parts as those in the first to third embodiments, and detailed description thereof is omitted.

(4-1) Configuration of a Part Ranging from a Bead Portion to a Sidewall Portion

In a pneumatic tire 4 shown as the fourth embodiment, a stiffener 135 and a pad rubber 136 are provided between a carcass body 21 and a carcass folded-back portion 22.

In the pneumatic tire 4 shown as the fourth embodiment, the height KSH from a rim base line BL to an end 135A of the stiffener 135 outside in the tire radial direction, the height OWH from the rim base line BL to the carcass maximum width portion 20W, and the height FH from the rim base line BL to an end 101A of a rim flange 101 outside in the tire radial direction satisfy the relation of $0.2 \leq [(KSH-FH)/(OWH-FH)] \leq 0.28$.

Further, the 100% elongation modulus Mn1 of the stiffener 135, the 100% elongation modulus Mn2 of the pad rubber 136, and the 100% elongation modulus Mn3 of the rubber material 24, respectively, satisfy the relation of $Mn1>Mn3>Mn2$.

Further, a buffer rubber 140 is provided between the end 135A of the stiffener 135 outside in the tire radial direction and the carcass body 21, and between the end 136A of the pad rubber 136 inside in the tire radial direction and the carcass body 21. The 100% elongation modulus Mn4 of the buffer rubber 140 is 0.7 to 1.0 times of the 100% elongation modulus of the pad rubber 136, that is, satisfying the relation of $0.7 \times Mn2 \leq Mn4 \leq Mn2$.

(4-2) Functions and Effects

In the pneumatic tire 4, as the buffer rubber 140 is provided in a part likely to receive a reactive force from a rim flange, the rigidity difference between the carcass body 21 and stiffener 135 can be decreased, and distortion of the rubber material 24 can be decreased. When the 100% elongation modulus of the buffer rubber decreases to lower than 70% of the 100% elongation modulus of the pad rubber 136, distortion concentrates on the buffer rubber, and the buffer rubber is likely suffer damage. This is unsuitable.

(5) Other Embodiments

Although the present invention has been described in terms of preferred embodiments, the foregoing discussion and drawings are not to be understood as restrictive of the invention. It will be appreciated that various alternative embodiments, examples might be made by those skilled in the art. For example, the embodiments of the present invention may be modified as follows.

In the embodiments, the 100% elongation modulus Mn1 of the stiffener 31, the 100% elongation modulus Mn2 of the pad rubber 32, and the 100% elongation modulus Mn3 of the rubber material 24, respectively, satisfy the relation of Mn1>Mn3>Mn2, but this is not restrictive. For example, it may satisfy the relation of Mn1>Mn2>Mn3.

In the embodiments, the height PSH from the rim base line BL to the end 32B of the pad rubber 32 outside in the tire radial direction has been defined substantially equal to the height OWH from the rim base line BL to the carcass maximum width portion 20W. However, for example, the heights may be PSH<OWH. The end of the pad rubber outside in the tire radial direction may be closer to inside in the tire radial direction than the height CE. In this case, a hard-to-crack rubber may be provided adjacent to the end 22a of the carcass folded-back portion 22. As a result, it is possible to prevent a crack in the surrounding rubber caused by the end 22a of the carcass folded-back portion 22. As a hard-to-crack rubber, it is permitted to use a rubber with the 100% elongation modules lower than the 100% elongation modules of the pad rubber 32.

As described above, many embodiments not disclosed herein are to be understood as included in the present invention. The scope of the invention should, therefore, be defined by the appended claims.

EXAMPLES

We have manufactured pneumatic tires of examples 1-4 and comparative examples 1-4 by changing conditions, and conducted durability tests to examine the durability of a part from a bead portion to a sidewall portion under the following conditions. The example 1 is a pneumatic tire 1 having the structure shown in FIG. 2, the example 2 is a pneumatic tire 2 having the structure shown in FIG. 7, the example 3 is a pneumatic tire 3 having the structure shown in FIG. 8, and the example 4 is a pneumatic tire 4 having the structure shown in FIG. 9, respectively.

Figure 10:
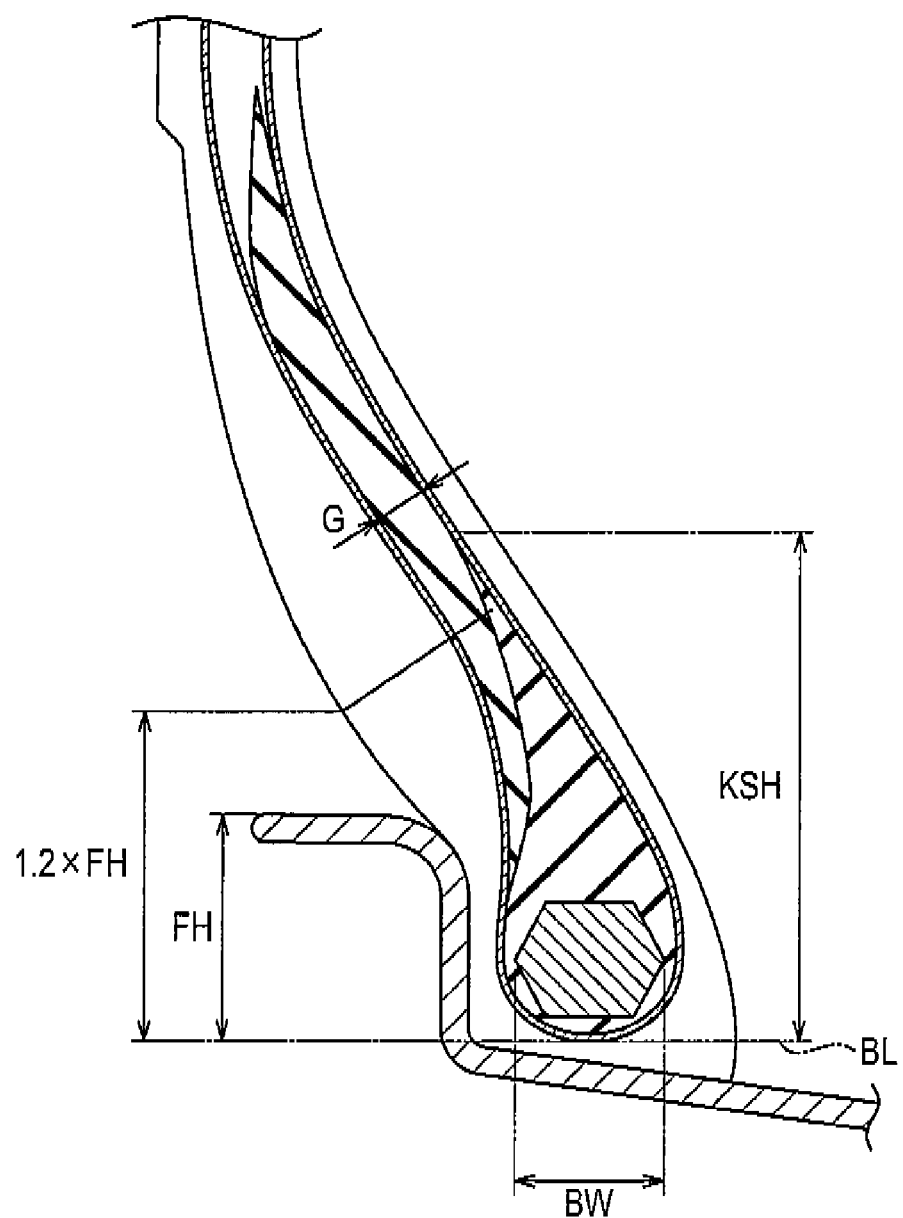
FIG. 10 shows a magnified sectional view in tire radial direction and tire width direction illustrating a part ranging from a bead portion to a sidewall portion of a comparative example pneumatic tire.
Figure 11:
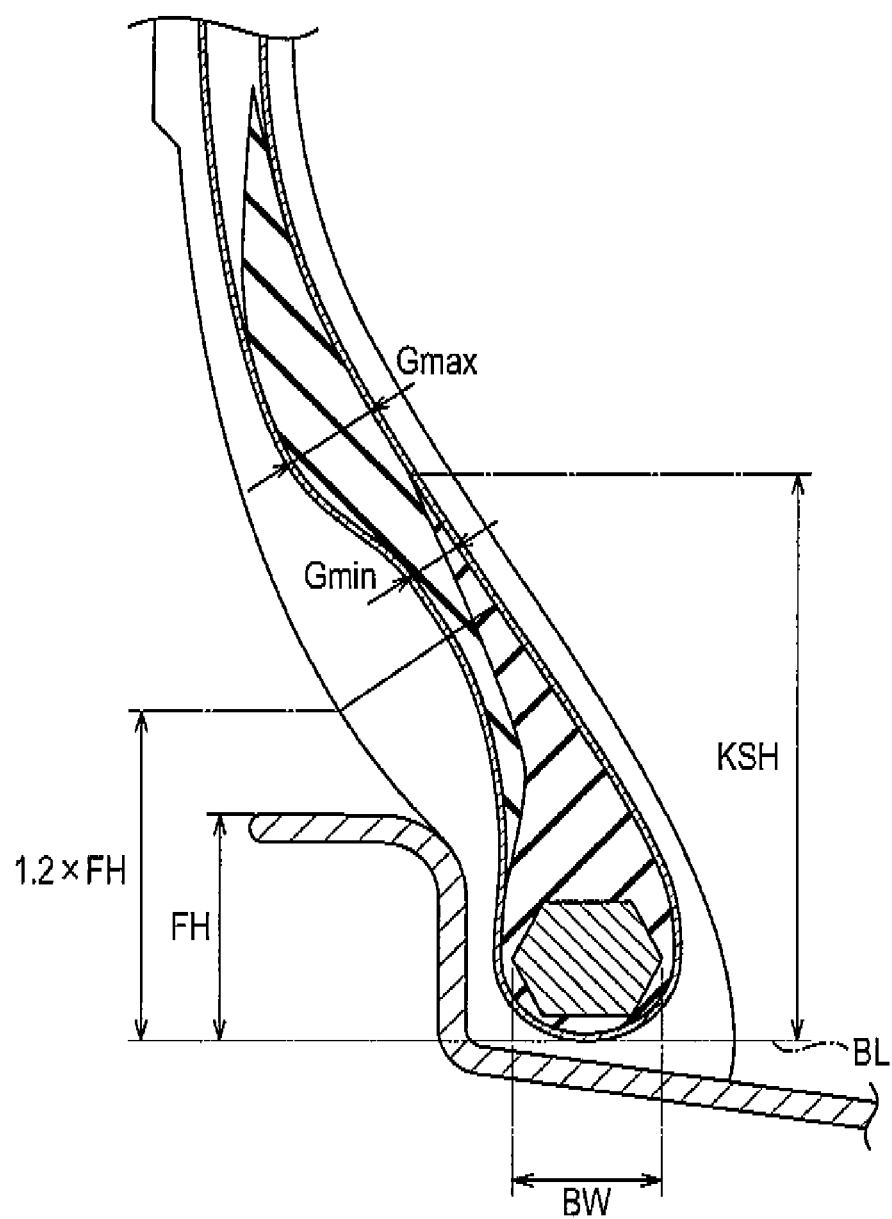
FIG. 11 shows a magnified sectional view in tire radial direction and tire width direction illustrating a part ranging from a bead portion to a sidewall portion of another comparative example.

The structure of the comparative example 1 is shown in FIG. 10. The structure of the comparative example 2 is shown in FIG. 11. The structures of the comparative examples 1 and 2 are similar to those shown in FIGS. 2 and 7, except that the end of the stiffener outside in the tire radial direction is more outside in the tire radial direction than the pneumatic tires 1 and 2 shown in FIGS. 2 and 7. In the comparative example 3, the ratio of the distance DA to the distance G3 in the pneumatic tire 3 shown in FIG. 8 is changed.

Tire size: 59/80R63
Inside pressure: Set to 500 kPa.
Rim: TRA standard rim
Drum tester: Drum diameter 7 m
Drum rotation speed: 8 km/h
Drum load: 150% to 180% of standard load 999.6 kN (Step load system) A step load system sets a standard load of 150% at a startup when applying a drum load to an object pneumatic tire for 12 hours, thereafter, add 10% of the standard load, and finally applies 180% of the standard load.

After 12 hours, we have cut out a part ranging from a bead portion to a sidewall portion of the pneumatic tire, and visually checked the cord and rubber material for cracks. The durability test results are shown in FIG. 12. The test results are expressed by indexes assuming a comparative example to be 100.

According to the results shown in FIG. 12, the pneumatic tire of the examples 1 to 4, it is proved that the cord of the carcass folded-back portion is not cracked, the distortion index of the rubber material 24 is decreased, and the rubber material contacting the stiffener is not cracked.

According to the above results, it is proved that in the pneumatic tire of the example, the rigidity of the part ranging from the bead portion to sidewall portion is ensured, and the durability of that part can be enhanced at a high level.

It should be noted by reference the entire contents of Japanese Patent Application No. 2010-207946 (filed Sep. 16, 2010) is incorporated the specification of the present invention.

INDUSTRIAL APPLICABILITY

As described above, according to the pneumatic tire of the present invention, it is possible to ensure the rigidity and enhance the durability of a part ranging from a bead portion to sidewall portion at a high level.

The invention claimed is:
1. A wheel assembly comprising:
a rim; and
a pneumatic tire provided on the rim and comprising a carcass having a carcass body composed of a ply formed of a plurality of carcass cords, covered with rubber material, toroidally extending between a pair of bead cores, and a carcass folded-back portion where the carcass body wound around the bead core from inside toward outside of the tire and extended outside in a tire radial direction, wherein
a gradual decrease region is provided, in which a distance between the carcass body and the carcass folded-back portion along a line normal to the carcass body gradually decreases toward outside in the tire radial direction,
a first filling material and a second filling material sequentially arranged from the bead core toward outside in the tire radial direction, are provided between the carcass body and the carcass folded-back portion located outside in a tire width direction than the carcass body located,
a part of the first filling material and the second filling material contacts with the rubber material forming the carcass body,
the end of the first filling material outside in the tire radial direction and an end of the second filling material inside in the tire radial direction are overlapped in the tire width direction,
a thickness in the tire width direction of the first filling material at the end outside in the tire radial direction decreases toward outside in the tire radial direction,
an end of the second filling material inside in the tire radial direction is located more inside in the tire radial direction than a contact position in contact with a rim flange of the rim defined by standards for mounting the pneumatic tire in the bead portion of the pneumatic tire,
a height CE from a rim base line, which is an axis line of the tire passing through a position in the rim defining a rim diameter, to an end of the carcass folded-back portion, and a height OWH from the rim base line to a carcass maximum width portion of the carcass body having a maximum width in the tire width direction, satisfy a relation of 0.850WH≤CE≤1.2OWH, and
a height KSH from the rim base line to the end of the first filling material outside in the tire radial direction, the height OWH, and a height FH from the rim base line to the end of the rim flange outside in the tire radial direction, satisfy a relation of $0.2 \leq [(KSH-FH)/(OWH-FH)] \leq 0.28$, wherein:

the carcass has a parallel region where a distance between the carcass body and the carcass folded-back portion on the line normal to the carcass body is constant, an end of the first filling material outside in the tire radial direction is located in the parallel region, and wherein a length on the parallel region extending in an extending direction of the carcass body is larger than the distance between the carcass body and the carcass folded-back portion.

2. The wheel assembly according to claim 1, wherein a 100% elongation modulus Mn1 of the first filling material, a 100% elongation modulus Mn2 of the second filling material, and a 100% elongation modulus Mn3 of the rubber material satisfy a relation of Mn1>Mn3>Mn2.

3. The wheel assembly according to claim 2, wherein a third filling material located between the end of the first filling material outside in the tire radial direction and the carcass body, is provided between the end of the second filling material inside in the tire radial direction and the carcass body, and the 100% elongation modulus of the third filling material is 0.7 to 1.0 times of the 100% elongation modulus of the second filling material.

4. The wheel assembly according to claim 1, wherein the carcass has a longest part, where the distance between the carcass body and the carcass folded-back portion is maximum, more outside in the tire radial direction than the gradual decrease region, and an outer gradual decrease region, where the distance between the carcass body and the carcass folded-back portion gradually decreases from the longest part toward outside in the tire radial direction, and the longest part is located within a height of 3.75FH from the rim base line outside in the tire radial direction.

5. The wheel assembly according to claim 1, wherein a distance DA between the carcass body and the end of the first filling material outside in the tire radial direction on the line normal to the carcass body passing through the end of the first filling material outside in the tire radial direction, and a distance G3 between the carcass body and the carcass folded-back portion on the line normal to the carcass body, satisfy a relation of $0.25G3 \leq DA 0.75G3$.

6. The wheel assembly according to claim 1, wherein the height CE and the height SH from the rim base line to the carcass on an equator line of the pneumatic tire satisfy a relation of $0.4SH \leq CE \leq 0.6SH$.

7. The wheel assembly according to claim 1, wherein a distance G1 between the carcass body and the carcass folded-back portion on a line normal to the carcass body passing through a position in the bead portion equivalent to 1.2FH from the rim base line toward outside in the tire radial direction, and a length BW of the bead core in the tire width direction satisfy a relation of $0.3BW \leq G1 \leq 0.4BW$.

\* \* \* \* \*